(12) United States Patent
Xing et al.

(10) Patent No.: US 11,043,105 B2
(45) Date of Patent: Jun. 22, 2021

(54) HAND-WASHING MONITORING METHOD, HAND-WASHING MONITORING DEVICE, AND ELECTRONIC DEVICE

(71) Applicant: BEIJING XIAOMI MOBILE SOFTWARE CO., LTD., Beijing (CN)

(72) Inventors: Zheng Xing, Beijing (CN); Yingchun Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/876,067

(22) Filed: May 17, 2020

(65) Prior Publication Data

US 2021/0150880 A1 May 20, 2021

(30) Foreign Application Priority Data

Nov. 14, 2019 (CN) .......................... 201911115675.X

(51) Int. Cl.
*G08B 21/24* (2006.01)
*H04W 76/10* (2018.01)
*G08B 7/06* (2006.01)

(52) U.S. Cl.
CPC ............. *G08B 21/245* (2013.01); *G08B 7/06* (2013.01); *H04W 76/10* (2018.02)

(58) Field of Classification Search
CPC .............................. G08B 21/245; A61B 90/80
USPC .................. 340/573.1; 222/23, 638; 700/244
See application file for complete search history.

(56) References Cited

U.S. PATENT DOCUMENTS

| 6,236,317 | B1 * | 5/2001 | Cohen | .................. | G08B 21/245 137/552.7 |
| 8,237,558 | B2 * | 8/2012 | Seyed Momen | ..... | G01S 1/7034 340/539.11 |
| 9,030,325 | B2 * | 5/2015 | Taneff | .................. | G08B 21/245 340/573.1 |
| 9,418,536 | B1 * | 8/2016 | Felch | .................... | G08B 21/245 |
| 10,121,149 | B2 * | 11/2018 | Davis | ..................... | A61B 90/98 |
| 10,482,753 | B2 * | 11/2019 | Nelson | ................... | G06Q 50/22 |

(Continued)

FOREIGN PATENT DOCUMENTS

| CN | 104523279 A | 4/2015 |
| CN | 105608654 A | 5/2016 |

(Continued)

OTHER PUBLICATIONS

General Sensing, MedSense Clear, 2017 pp. 1-12 (Year: 2017).*

(Continued)

*Primary Examiner* — Eric Blount
(74) *Attorney, Agent, or Firm* — Syncoda LLC; Feng Ma

(57) ABSTRACT

A hand-washing monitoring method includes: establishing remote connection with a hand-washing device; acquiring usage information of the hand-washing device based on the remote connection; outputting hand-washing statistical data according to the acquired usage information. A connection can be established between the terminal and the hand-washing device, through the connection, the terminal can remotely acquire usage situations of the hand-washing device monitor hand-washing actions of the user of the hand-washing device in real time according to the usage situations of the hand-washing device, and supervise the hand-washing situations of the user of the hand-washing device.

17 Claims, 8 Drawing Sheets

(56) References Cited

U.S. PATENT DOCUMENTS

| | | | |
|---|---|---|---|
| 10,679,488 B2* | 6/2020 | Liu | G16H 50/30 |
| 2003/0019536 A1 | 1/2003 | Smith | |
| 2004/0015132 A1* | 1/2004 | Brown | A61B 5/742 |
| | | | 604/131 |
| 2006/0154222 A1* | 7/2006 | Lane | G09B 23/28 |
| | | | 434/262 |
| 2008/0256445 A1* | 10/2008 | Olch | G16H 40/67 |
| | | | 715/700 |
| 2009/0195385 A1* | 8/2009 | Huang | G16H 40/20 |
| | | | 340/572.1 |
| 2009/0224924 A1* | 9/2009 | Thorp | G08B 21/245 |
| | | | 340/573.1 |
| 2010/0134296 A1* | 6/2010 | Hwang | G08B 21/245 |
| | | | 340/573.1 |
| 2011/0254682 A1* | 10/2011 | Sigrist Christensen | |
| | | | G08B 21/245 |
| | | | 340/539.12 |
| 2012/0212344 A1* | 8/2012 | Forsberg | G08B 21/245 |
| | | | 340/573.1 |
| 2013/0229276 A1* | 9/2013 | Hunter | G08B 21/245 |
| | | | 340/501 |
| 2014/0266692 A1* | 9/2014 | Freedman | G08B 21/245 |
| | | | 340/539.11 |
| 2015/0134357 A1 | 5/2015 | Davis et al. | |
| 2015/0221208 A1* | 8/2015 | Knighton | G08B 21/245 |
| | | | 340/573.1 |
| 2016/0275779 A1* | 9/2016 | Hajdenberg | G08B 25/08 |
| 2016/0314683 A1* | 10/2016 | Felch | G08B 21/245 |
| 2018/0218591 A1* | 8/2018 | Easter | G16H 40/20 |
| 2019/0012898 A1* | 1/2019 | Wittrup | G08B 21/245 |
| 2019/0069154 A1* | 2/2019 | Booth | G06F 1/1635 |

FOREIGN PATENT DOCUMENTS

| | | |
|---|---|---|
| CN | 106233352 A | 12/2016 |
| CN | 109102870 A | 12/2018 |
| WO | 2008119158 A1 | 10/2008 |
| WO | 2010028320 A1 | 3/2010 |

OTHER PUBLICATIONS

Partial European Search Report in Application No. 20180552.0, dated Dec. 1, 2020.

Extended European Search Report in Application No. 20180552.0, dated Apr. 1, 2021.

* cited by examiner

HAND-WASHING MONITORING METHOD, HAND-WASHING MONITORING DEVICE, AND ELECTRONIC DEVICE

CROSS-REFERENCE TO RELATED APPLICATION

This application claims priority to Chinese Patent Application No. CN 201911115675.X filed on Nov. 14, 2019, the disclosure of which is hereby incorporated by reference in its entirety.

BACKGROUND

With the improvement of users' living standards, personal hygiene is drawing more attention among mobile device users.

SUMMARY

The present disclosure relates to a hand-washing monitoring method, a hand-washing monitoring device, and an electronic device.

According to an aspect of embodiments of the present disclosure, there is provided a hand-washing monitoring method, including: establishing remote connection with a hand-washing device; acquiring usage information of the hand-washing device based on the remote connection; outputting hand-washing statistical data according to the acquired usage information.

In some embodiments, the hand-washing monitoring method further includes: setting in advance prompt information, and sending a prompt instruction based on the prompt information, the prompt instruction being used to prompt hand-washing.

In some embodiments, the prompt information includes: time prompt information; and the sending a prompt instruction based on the prompt information includes: sending the prompt instruction according to the time prompt information set in advance.

In still another embodiment, the hand-washing monitoring method further includes: adjusting the time prompt information according to the outputted hand-washing statistical data In some embodiments, the prompt information further includes: position prompt information; sending a prompt instruction based on the prompt information includes: acquiring current positioning information of the hand-washing device, and comparing the positioning information with the position prompt information; sending, based on the comparison result, the prompt instruction when the positioning information is consistent with the position prompt information.

In some embodiments, acquiring current positioning information of the hand-washing device includes: acquiring the positioning information of the hand-washing device through a wearable device or the hand-washing device.

In some embodiments, the prompt information further includes: action information; sending a prompt instruction based on the prompt information includes: acquiring heartbeat and/or body temperature of a user of the hand-washing device through a wearable device, and acquiring action information of the user of the hand-washing device based on the heartbeat and/or body temperature; and sending the prompt instruction when the action information of the user of the hand-washing device is consistent with the action information in the prompt information.

In some embodiments, sending a prompt instruction includes: sending a prompt instruction to the hand-washing device, or sending a prompt instruction to a bound wearable device.

In some embodiments, a prompt response includes one or more of a sound prompt, a vibration prompt, or a video prompt.

In some embodiments, the usage information includes: the number of hand-washing acquired within a predetermined time length; the outputting hand-washing statistical data according to the acquired usage information further includes: outputting whether the number of hand-washing within a predetermined time length reaches a predetermined number threshold.

In some embodiments, the usage information is acquired by responding to and recording hand-washing actions through infrared sensing by the hand-washing device.

In some embodiments, the usage information includes: information about that hand-washing material is given off after responding to hand-washing actions through infrared sensing by the hand-washing device.

In still another embodiment, a change prompt for changing the hand-washing device or the hand-washing material is received.

According to another aspect of embodiments of the present disclosure, there is provided a hand-washing monitoring device, including: a connecting module configured to establish remote connection with a hand-washing device; an acquiring module configured to obtain usage information of the hand-washing device based on the remote connection; a monitoring module configured to output hand-washing statistical data according to the acquired usage information.

In some embodiments, the hand-washing monitoring device further includes: a prompting module configured to set in advance prompt information and send a prompt instruction based on the prompt information, the prompt instruction being used to prompt hand-washing.

In some embodiments, the prompt information includes: time prompt information; the prompting module is further configured to: send the prompt instruction to the hand-washing device according to the time prompt information set in advance.

In some embodiments, the hand-washing monitoring device further includes: an adjusting module configured to adjust the time prompt information according to the outputted hand-washing statistical data.

In some embodiments, the prompt information includes: position prompt information; the prompting module is configured to send a prompt instruction based on the prompt information in the following manners: acquiring current positioning information of the hand-washing device, and comparing the positioning information with the position prompt information; and sending, based on the comparison result, the prompt instruction when the positioning information is consistent with the position prompt information.

In some embodiments, the acquiring module is further configured to: obtain the positioning information of the hand-washing device through a wearable device or the hand-washing device.

In some embodiments, the prompt information further includes: action information; the prompting module is configured to send a prompt instruction based on the prompt information in the following manners: acquiring heartbeat and/or body temperature of a user of the hand-washing device through a wearable device, and acquiring action information of the user of the hand-washing device based on the heartbeat and/or body temperature; and sending the prompt instruction when the action information of the user of the hand-washing device is consistent with the action information in the prompt information.

In some embodiments, sending a prompt instruction includes: sending a prompt instruction to the hand-washing device, or sending a prompt instruction to a bound wearable device.

In some embodiments, the prompt response includes one or more of a sound prompt, a vibration prompt, or a video prompt.

In some embodiments, the usage information includes: the number of hand-washing acquired within a predetermined time length; the monitoring module is further configured to: output whether the number of hand-washing within a predetermined time length reaches a predetermined number threshold.

In some embodiments, the usage information is acquired by responding to and recording hand-washing actions through infrared sensing by the hand-washing device.

In some embodiments, the usage information includes: information about that hand-washing material is given off after responding to hand-washing actions through infrared sensing by the hand-washing device.

In some embodiments, the hand-washing monitoring device further includes: a receiving module configured to receive a change prompt for changing the hand-washing device or the hand-washing material.

According to yet another aspect of embodiments of the present disclosure, there is provided an electronic device, including: a memory for storing instructions; and a processor for invoking instructions stored in the memory to execute any of the hand-washing monitoring method described above.

According to yet another aspect of embodiments of the present disclosure, there is provided a non-transitory computer-readable storage medium having stored therein computer-executable instructions that, when executed by a processor, cause any of the hand-washing monitoring method described above to be executed.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A hand-washing device can be used intelligently according to usage requirements, but usage situations of the hand-washing device often cannot be monitored in real time.

For example, during working days, parents cannot stay with their children and cannot monitor their children's health and hygiene at all times.

It is therefore difficult to know whether the children pay attention to health and hygiene at all times with the absence of the parents, and it is also difficult to remind the children.

An embodiment of the present disclosure provides a hand-washing monitoring method. A terminal establishes remote connection with a hand-washing device, acquires usage situations of the hand-washing device in real time, monitors hand-washing situations of the user of the hand-washing device in real time according to the usage situations of the hand-washing device, so as to achieve the purpose of supervising hand-washing.

Figure 1:
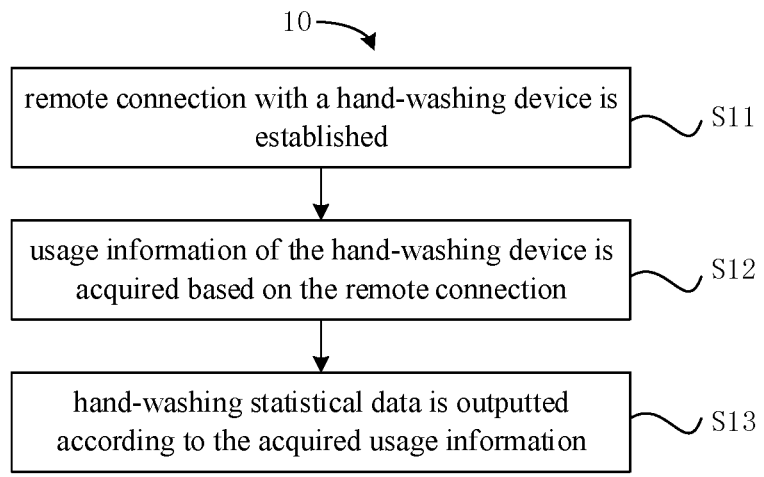
FIG. 1 is a flowchart of a hand-washing monitoring method shown according to an exemplary embodiment.

FIG. 1 is a flowchart of a hand-washing monitoring method shown according to an exemplary embodiment. As shown in FIG. 1, the hand-washing monitoring method 10 is applied to a terminal which can include any one or more of a mobile phone, a tablet, or a computer etc., and no limitation is made thereto in the present disclosure. The hand-washing monitoring method 10 includes the following steps S11 to S13.

In step S11, remote connection with a hand-washing device is established.

In some embodiments of the present disclosure, a wireless control module is provided on the terminal and the hand-washing device, the connection between the terminal and the hand-washing device is established through the wireless control modules of the terminal and the hand-washing device, so that the terminal and the hand-washing device can interact with each other. On the one hand, the terminal can establish remote connection with the hand-washing device at any spatial position. The terminal acquires usage information of the hand-washing device based on the remote connection.

In step S12, usage information of the hand-washing device is acquired based on the remote connection.

In some embodiments of the present disclosure, the terminal acquires the usage information of the hand-washing device based on the remote connection, so that the interaction between the terminal and the hand-washing device will not be affected by the position of the terminal, which enables the user of the terminal to obtain usage situations of the hand-washing device at any time and to monitor in real time the situations that the user of the hand-washing device washes hands by using the hand-washing device.

In some embodiments, the usage information is acquired by responding to and recording hand-washing actions through infrared sensing by the hand-washing device. Herein, the user of the hand-washing device places hands in front of the hand-washing device to represent that the user needs to wash hands. An infrared sensor is disposed inside the hand-washing device, and infrared sensing is performed for the action representing that the user needs to wash hands by the infrared sensor inside the hand-washing device. When it is sensed by the infrared sensor presence of the hands, a hand-washing response is performed, such as sending water, hand-washing sanitizer, hand-washing powder, hand-washing foam and other hand-washing materials, so that the user of the hand-washing device completes the hand-washing action. After the hand-washing action is completed, the hand-washing device records the usage information that the user of the hand-washing device has used the hand-washing device and has completed the hand-washing. The hand-washing device uploads the usage information to the terminal, which facilitates the terminal makes recording in real time, thereby monitoring hand-washing situations of the user of the hand-washing device.

In some embodiments, the usage information includes: information about that hand-washing material is given off after responding to hand-washing actions through infrared sensing by the hand-washing device. For example, when the infrared sensor senses the presence of the hands, the hand-washing material is given off according to a hand-washing instruction, and information on that the response has been made and the hand-washing material has been given off is acquired after the hand-washing device successfully gives of the hand-washing material.

In step S13, hand-washing statistical data is outputted according to the acquired usage information.

In some embodiments of the present disclosure, the terminal makes statistics of hand-washing data of the user of the hand-washing device according to the acquired usage information, and outputs the statistical hand-washing data to the user of the terminal, so that the user of the terminal can monitor hand-washing situations of the user of the hand-washing device in real time. The hand-washing data can include: usage time at which the hand-washing device is used, the number for which the hand-washing device is used, and no limitation is made thereto in some embodiments of the present disclosure.

In some embodiments of the present disclosure, the terminal can record in real time the usage information of the hand-washing device that is acquired each time. The user of the terminal can realize real-time monitoring of hand-washing situations of the user of the hand-washing device, based on the real-time recording of the terminal.

In some embodiments, the outputting hand-washing statistical data according to the acquired usage information further includes: outputting whether the number of hand-washing within a predetermined time length reaches a predetermined number threshold.

Figure 2:
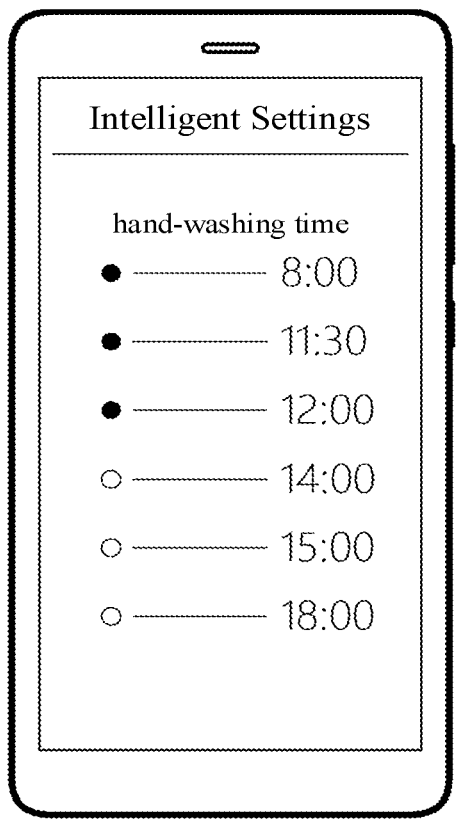
FIG. 2 is a schematic diagram of a hand-washing monitoring method shown according to an exemplary embodiment.

The number for which the user of the hand-washing device uses the hand-washing device to wash hands can be known according to the acquired usage information in some embodiments of the present disclosure. It is outputted by the terminal whether the number of hand-washing within a predetermined time length reaches a predetermined number threshold according to the acquired usage information. The user of the terminal can monitor in real time, according to an outputted result, whether the number of hand-washing of the user of the hand-washing device reaches the predetermined number threshold within a predetermined time length, so as to achieve the purpose of monitoring the hand-washing of the user of the hand-washing device in real time. For example, as shown in FIG. 2, the predetermined number threshold is outputted in advance by way of a list, a single hollow circle is used to indicate one time of hand-washing that is set in advance. When one time of hand-washing is acquired, a hollow circle is marked as a black solid circle to distinguish it from the number of unsuccessful hand-washing, which is convenient for the user of the terminal to determine, according to the output of the terminal, whether the number for which the user of the hand-washing device has washed hands within a predetermined time length reaches a predetermined number threshold.

Through the above embodiment, the terminal and the hand-washing device interact with each other by establishing remote connection. The user of the terminal can remotely obtain usage situations of the hand-washing device, and monitor the hand-washing actions of the user of the hand-washing device in real time according to the usage situations of the hand-washing device, so as to achieve the purpose of monitoring hand-washing of the user of the hand-washing device.

In another example of the present disclosure, prompt information can be set in advance when performing hand-washing monitoring, the user of the hand-washing device is prompted to wash hands based on the prompt information set in advance when hand-washing is needed, so as to realize hand-washing monitoring.

Figure 3:
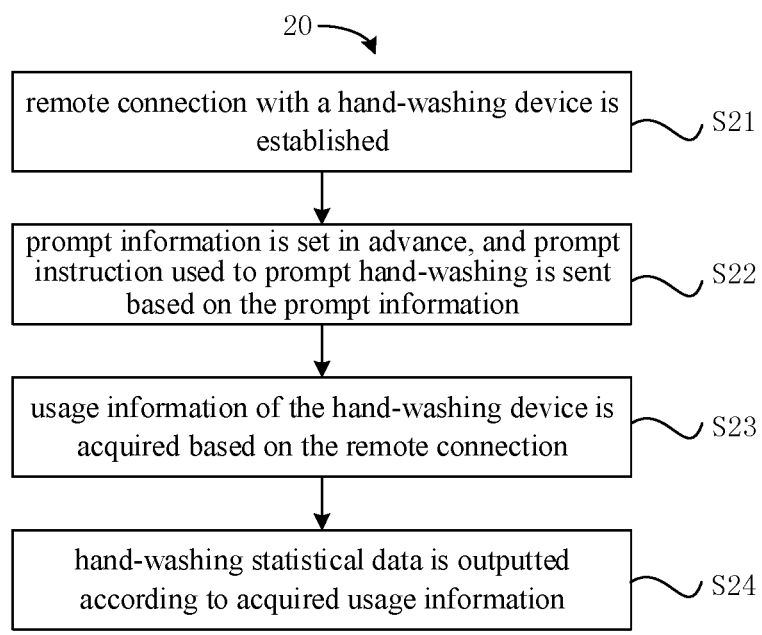
FIG. 3 is a flowchart of another hand-washing monitoring method shown according to an exemplary embodiment.

FIG. 3 shows a flowchart of a hand-washing monitoring method 20 in an exemplary embodiment. Referring to FIG. 3, the hand-washing monitoring method 20 includes the following steps.

In step S21, remote connection with a hand-washing device is established.

In step S22, prompt information is set in advance, and a prompt instruction used to prompt hand-washing is sent based on the prompt information.

Figure 4:
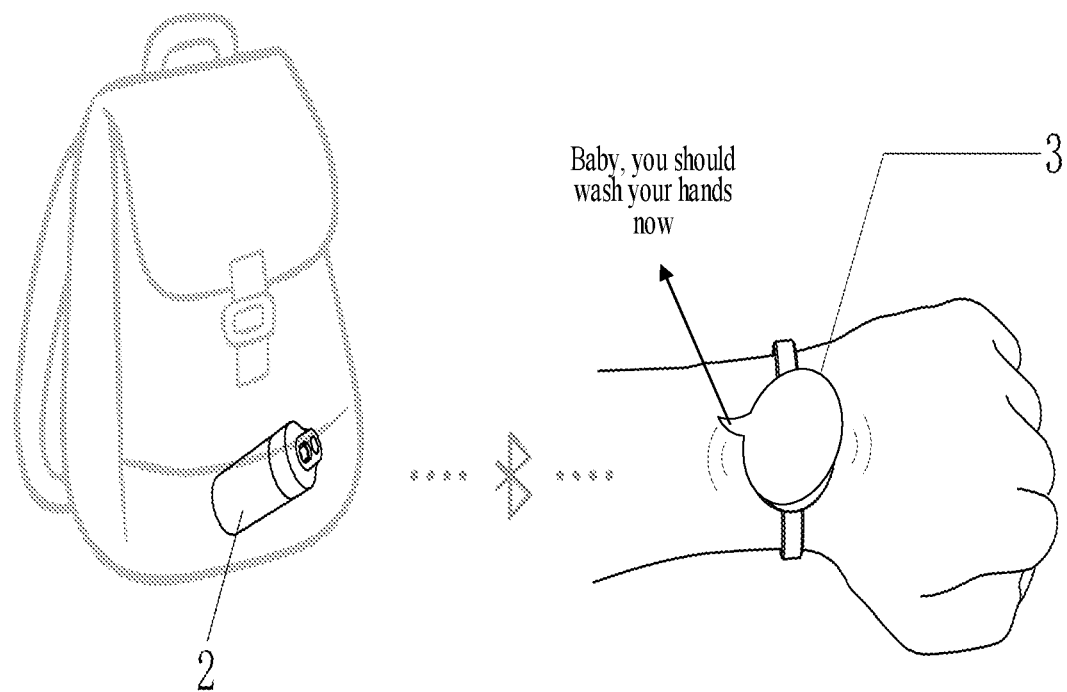
FIG. 4 is a flowchart of yet another hand-washing monitoring method shown according to an exemplary embodiment.

The user of the terminal sets in advance prompt information on the terminal. When the terminal determines that a current action status of the user of the hand-washing device meets a condition of the prompt information set in advance, the terminal sends a prompt instruction to prompt the user of the hand-washing device to use the hand-washing device. In some embodiments, sending a prompt instruction can include: sending a prompt instruction to the hand-washing device, or sending a prompt instruction to a bound wearable device, which facilitates the user of the hand-washing device receiving the prompt instruction at any time. For example, in FIG. 4, the wearable device 3 is a smart watch. When the hand-washing device 2 is placed in a backpack by the user of the hand-washing device, a dial screen is used to send a prompt response to the user of the hand-washing device after the wearable device 3 receives the prompt instruction, thereby prompting the user of the hand-washing device to wash hands.

In some embodiments, the prompt information includes: time prompt information. For example, the time prompt information in some embodiments of the present disclosure can be a predetermined prompt time for prompting the user to use the hand-washing device. Herein, multiple time points in one day can be set as the prompt time. When the current time is consistent with the predetermined prompt time, the terminal sends a prompt instruction to the hand-washing device to prompt the user to use the hand-washing device. In an example, the setting can be made according to the schedule of the user of the hand-washing device. For example, as shown in FIG. 2, 8 am, 11:30 am, 12 pm, 2 pm, 3 pm, and 6 pm are set as the prompt time to prompt the user to use the hand-washing device. Herein, 8 am is the time before the user of the hand-washing device starts actions, 11:30 am is the time at which lunch starts, 12 pm is the time at which lunch ends, 2 pm is the time at which lunch break ends, 3 pm is the time for afternoon dessert, and 6 pm is the dinner time. For example, when the current time is 11:30 am, which is consistent with the predetermined prompt time of "11:30 am," the terminal sends a prompt instruction to the hand-washing device at this time, which facilitates prompting the user of the hand-washing device to use the hand-washing device.

In some embodiments, the user of the terminal can adjust the time prompt information according to hand-washing statistical data recording outputted by the terminal within a period of time, so that the time prompt information matches the schedule of the user of the hand-washing device, which helps to prompt the user of the hand-washing device to use the hand-washing device more accurately.

In some embodiments, the prompt information includes: position prompt information. The sending a prompt instruction based on the prompt information includes: acquiring current positioning information of the hand-washing device, and comparing the positioning information with the position prompt information. Based on the comparison result, the prompt instruction is sent when the positioning information is consistent with the position prompt information.

In some embodiments of the present disclosure, a position for sending position prompt information can be set in advance. The position set in advance is usually a position where hand-washing is required, such as a toilet, a cafeteria, etc. In some embodiments of the present disclosure, the terminal can obtain the position information of the user of the hand-washing device in real time. The prompt instruction is sent when the user of the hand-washing device is at a position set in advance, for example, the position set in advance is a toilet which the user of the hand-washing device must go to every day. When it is determined according to the current position information of the user of the hand-washing device that the position of the user of the hand-washing device is a toilet, a prompt instruction is sent to the hand-washing device to prompt the user of the hand-washing device that hands need to be washed currently.

In some embodiments of the present disclosure, positioning coordinates of the hand-washing device can be acquired through a wearable device worn by the user of the hand-washing device when the position information of the hand-washing device is acquired; and the positioning information is acquired based on the positioning coordinates. Herein, the terminal can accurately obtain the current position of the user of the hand-washing device through the positioning coordinates, and enable the prompt instruction to be accurately sent to the user of the hand-washing device through a linkage between the terminal and the wearable device.

In some embodiments, the prompt information includes: action information. Herein, the action information can be understood as some actions which require hand-washing, for example, sports, waking-up, and after defecation and so on are actions which require hand-washing. In some embodiments of the present disclosure, actions which require hand-washing are set in advance in the terminal, so as to prompt and monitor the user of the hand-washing device. In some embodiments of the present disclosure, body status information of the user of the hand-washing device can be determined through heartbeat and/or body temperature of the user of the hand-washing device, and then the actions of the user of the hand-washing device can be acquired according to the body status information. Therefore, the actions set in advance in some embodiments of the present disclosure can be heartbeat and/or body temperature etc. In an implementation, heartbeat and/or body temperature etc. of the user of the hand-washing device can be acquired by a wearable device. In some embodiments of the present disclosure, when it is determined that the action information of the user of the hand-washing device obtained by acquiring heartbeat and/or body temperature of the user of the hand-washing device is the action information that requires hand-washing, a prompt instruction is sent.

In some embodiments of the present disclosure, the prompt information set in advance can be action information, or can be one or more of action information, time prompt information, and position prompt information.

In an application scenario, the prompt information set in advance can be: action information such as waking up and ending exercise etc. Based on the information such as heartbeat, body temperature and so on of the user of the wearable device which is acquired through monitoring in real time by the wearable device, the action information of the hand-washing device is determined. For example: if the heartbeat speeds up for a long time, it is possible that the user of the hand-washing device is exercising at this time, and when the heartbeat gradually slows down to return to the normal frequency after a period of time, it is indicated that the user of the hand-washing device has ended the exercise. It is assumed that the action information of the user is determined by the wearable device as ending excise, because the prompt information set in advance includes the action information of ending exercise, an instruction is sent to the hand-washing device at this time to prompt the user of the hand-washing device that the hands need to be washed at this time. Another example, the heartbeat frequency is slow when the human body is sleeping, but the heartbeat frequency will gradually increase when gradually waking up, in combination with the body temperature acquired in real time, it can be known whether the user of the hand-washing device is just awake. If the prompt information set in advance includes wakeup action information, and the action of the user of the hand-washing device acquired by analysis is just waking up, then the terminal sends a prompt instruction to the hand-washing device to prompt the user of the hand-washing device to wash hands.

In the embodiment provided by the present disclosure, the above-mentioned wearable device can be a device such as a smart bracelet or a smart watch etc., no limitation is made herein.

In step S23, usage information of the hand-washing device is acquired based on the remote connection.

In some embodiments of the present disclosure, after the hand-washing device or the wearable device acquires the prompt instruction sent remotely by the terminal, a prompt response is sent to the user of the hand-washing device, and is used to prompt the user of the hand-washing device to use the hand-washing device at this time. The user of the hand-washing device uses the hand-washing device to complete the hand-washing action according to the prompt response sent by the hand-washing device. The hand-washing device uploads the usage information of having completed the hand-washing action to the terminal in real time, so that the terminal can monitor whether the user of the hand-washing device has completed the hand-washing action under the condition of the prompt information set in advance.

In some embodiments, the usage information of the hand-washing device is sent to the terminal by using remote connection. In an application scenario, connection is established between the hand-washing device and the wearable device via Bluetooth, the hand-washing device sends the usage information to the wearable device through Bluetooth interaction, and then the wearable device sends the acquired usage information to the terminal to obtain the usage information of the hand-washing device.

In some embodiments, the prompt response includes one or more of a sound prompt, a vibration prompt, and a video prompt.

The hand-washing device or the wearable device gives out any one of or any combination of a sound prompt, a vibration prompt or a video prompt according to the received prompt instruction as the prompt response, to cause the user of the hand-washing device to perceive the prompt response of the hand-washing device and to execute the hand-washing action.

In some embodiments of the present disclosure, if the user of the hand-washing device fails to perform a hand-washing action when receiving the prompt response sent by the hand-washing device or the wearable device for the first time, the hand-washing device or the wearable device can send the prompt response again after a predetermined waiting time. The prompt response sent again can continue to use the prompt response sent for the first time, or it can be changed to a new prompt response to achieve the purpose of prompting the user of the hand-washing device to use the hand-washing device to perform the hand-washing action.

In step S24, the hand-washing statistical data is outputted according to the acquired usage information.

Based on an inventive concept, the present disclosure further provides a flowchart of yet another exemplary hand-washing monitoring method.

Figure 5:
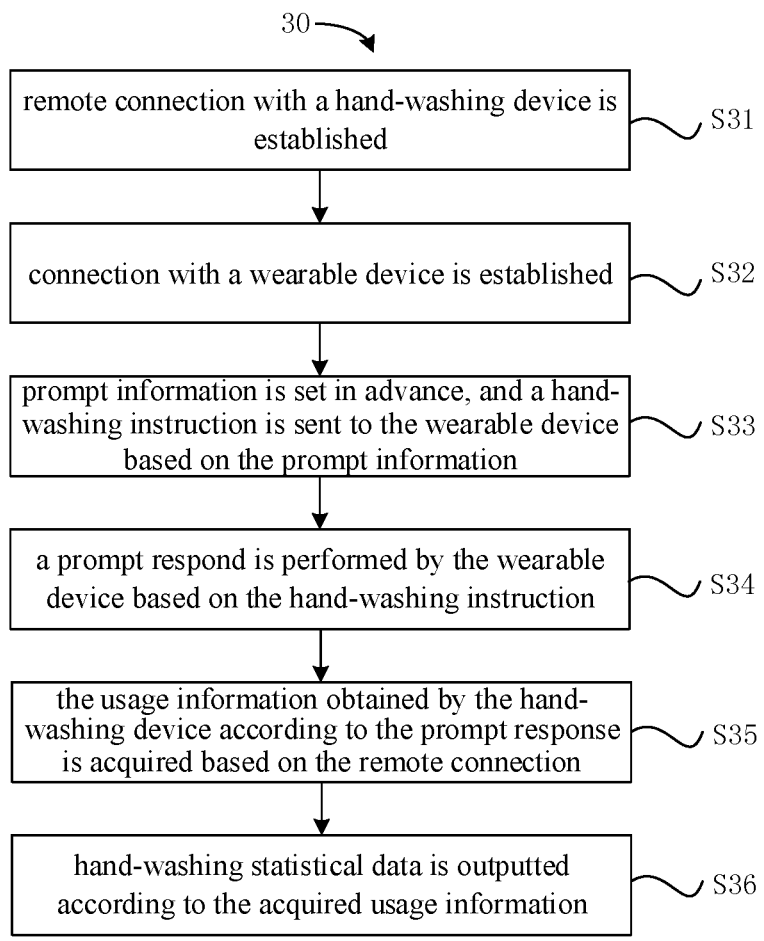
FIG. 5 is a flowchart of yet another hand-washing monitoring method shown according to an exemplary embodiment.

FIG. 5 shows a flowchart of an exemplary hand-washing monitoring method 30. Referring to FIG. 5, the hand-washing monitoring method 30 includes the following steps.

In step S31, remote connection with a hand-washing device is established.

A connection between the terminal and the hand-washing device is established through a wireless control module, to facilitate interaction therebetween, and the terminal can acquire the usage information of the hand-washing device based on the remote connection at any spatial position.

In step S32, a connection with a wearable device is established.

The terminal is connected to the wearable device of the user of the hand-washing device to prompt the user of the hand-washing device to complete the hand-washing action.

In step S33, prompt information is set in advance, and a hand-washing instruction is sent to the wearable device based on the prompt information.

The user of the terminal sets in advance the prompt information on the terminal, which is used to send a prompt instruction to the wearable device when the current action status of the user of the hand-washing device meets a condition of the prompt information set in advance, so as to remind the user of the hand-washing device to use the hand-washing device.

In step S34, a prompt respond is performed by the wearable device based on the hand-washing instruction.

The wearable device performs a prompt response according to the received hand-washing instruction, so as to prompt the user of the hand-washing device to use the hand-washing device. In the embodiment provided by the present disclosure, the wearable device can be a device such as a smart bracelet or a smart watch etc., no limitation is made herein.

In some embodiments, the prompt response includes one or more of a sound prompt, a vibration prompt, and a video prompt.

any one prompt response of a sound prompt, a vibration prompt and a video prompt is sent by the wearable device according to the received prompt instruction, to cause the user of the hand-washing device to perceive the prompt response of the hand-washing device and to execute the hand-washing action.

In step S35, the usage information obtained by the hand-washing device according to the prompt response is acquired based on the remote connection.

After acquiring the prompt instruction sent remotely by the terminal, a prompt response is sent to the user of the hand-washing device by the wearable device, and used to prompt the user of the hand-washing device to use the hand-washing device at this time. The user of the hand-washing device uses the hand-washing device to complete the hand-washing action according to the prompt response sent by the hand-washing device. The usage information of having completed the hand-washing action at this time is uploaded to the terminal in real time, and then it can be monitored that the user of the hand-washing device has completed the hand-washing action under the condition of the prompt information set in advance.

In step S36, the hand-washing statistical data is outputted according to the acquired usage information.

Through the above embodiments, the action status of the user can be monitored in real time by the wearable device worn by the user of the hand-washing device, and the user of the hand-washing device can be prompted according to the action status, thereby enabling the user of the hand-washing device to complete the hand-washing action under the prompt information set in advance, so that the prompt response can accurately prompt when the user of the hand-washing device needs to wash hands.

Further, in some embodiments of the present disclosure, the terminal can also monitor information of whether the hand-washing device is available, for example, the hand-washing device or the hand-washing material can be changed after the hand-washing device is damaged or the hand-washing material in the hand-washing device is used up.

Figure 6:
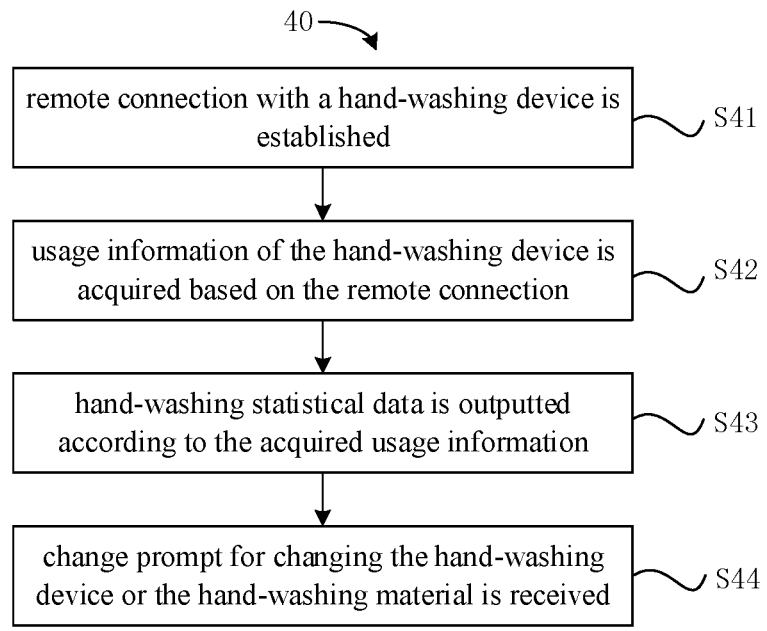
FIG. 6 is a flowchart of yet another hand-washing monitoring method shown according to an exemplary embodiment.

FIG. 6 shows a flowchart of an exemplary hand-washing monitoring method 40. Refer to FIG. 6, the hand-washing monitoring method 40 includes the following steps.

Herein, steps S41, S42, and S43 are implemented in the same manner as the hand-washing monitoring method 10, no details will be repeated herein.

In step S44, a change prompt for changing the hand-washing device or the hand-washing material is received.

As the hand-washing device is used for a long time, the hand-washing material inside the hand-washing device will be consumed. When the hand-washing material can no longer be provided according to the user's hand-washing instruction, the hand-washing device will send, through remote connection, to the terminal, the change prompt of changing the hand-washing device or the material inside the hand-washing device, so as to prompt the user of the terminal to replace the hand-washing device or hand-washing material.

Figure 7:
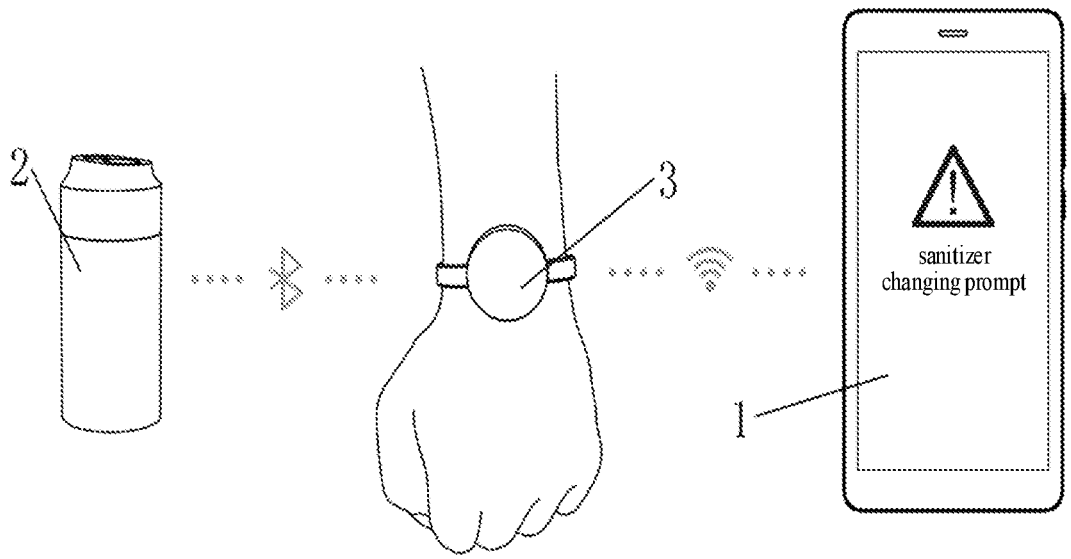
FIG. 7 is a flowchart of yet another hand-washing monitoring method shown according to an exemplary embodiment.

In some embodiments, for example, as shown in FIG. 7, when the hand-washing device 2 can no longer provide hand-washing material according to the user's hand-washing instruction, the hand-washing device 2 sends an instruction to the wearable device 3 via Bluetooth to prompt the terminal 1 to change the hand-washing device or the hand-washing material. According to the received prompt instruction, the wearable device 3 sends a changing prompt that the hand-washing device 2 needs to change the hand-washing device or the hand-washing material to the terminal 1 through wireless transmission, so as to prompt the user of the terminal to change the hand-washing device or the hand-washing material.

Through the above embodiment, the user of the terminal can update the hand-washing device or the hand-washing material in time according to the received change prompt, so that the user of the hand-washing device can continue to use the hand-washing device for hand-washing.

Based on the same concept, embodiments of the present disclosure further provide a hand-washing monitoring device.

It can be understood that, in order to achieve the above functions, the hand-washing monitoring device provided by the embodiments of the present disclosure includes a hardware structure and/or a software module corresponding to each function. With reference to the units and algorithm steps of each example disclosed in the embodiments of the present disclosure, the embodiments of the present disclosure can be implemented in the form of hardware or a combination of hardware and computer software. Whether a certain function is performed by hardware or computer software-driven hardware depends on the specific application and design constraints of the technical solutions. Those skilled in the art can use different methods to implement the described functions for each specific application, but such implementation should not be considered to go beyond the scope of the technical solutions of the embodiments of the present disclosure.

Figure 8:
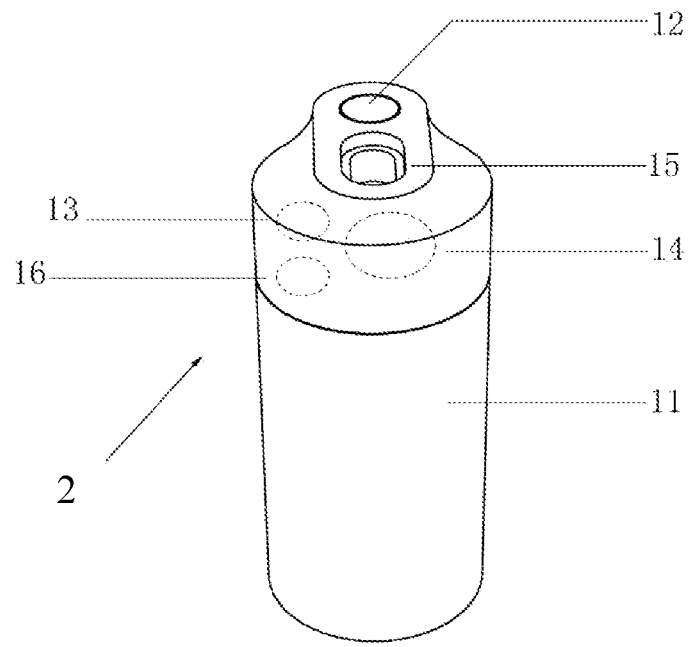
FIG. 8 is a hand-washing device shown according to an exemplary embodiment.

FIG. 8 is a hand-washing device 1 according to an exemplary embodiment.

Referring to FIG. 8, the hand-washing device can include: a hand sanitizer bottle 11, an infrared sensor 12, a wireless controller 13, a foaming component 14, a foam outlet 15, and a battery 16.

The hand sanitizer bottle 11 is configured to provide hand-washing material.

The infrared sensor 12 is configured to execute a hand-washing instruction sent by a user of the hand-washing device.

The wireless control module 13 is configured to establish connection with a terminal or a wearable device, or to establish connection with a terminal and a wearable device.

The foaming module 14 is configured to beat the hand-washing material into foam according to the hand-washing instruction received by the infrared sensor.

The foam outlet 15 is configured to discharge the formed foam to the outside of the hand-washing device.

The battery module 16 is configured to supply power to enable the hand-washing device to operate normally.

Figure 9:
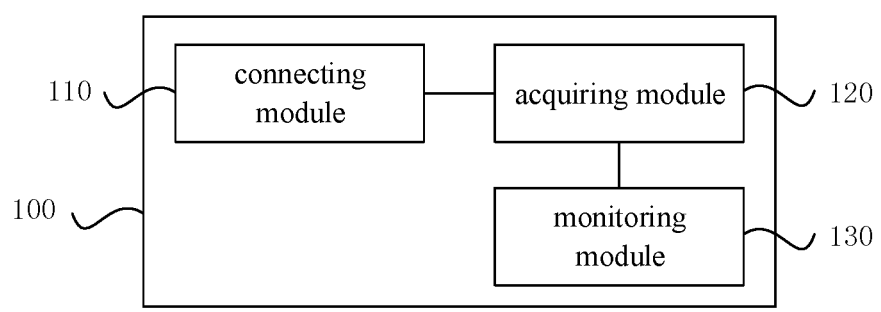
FIG. 9 is a block diagram of a hand-washing monitoring device shown according to an exemplary embodiment.

FIG. 9 is a block diagram of a hand-washing monitoring device 100 according to an exemplary embodiment. Referring to FIG. 9, the device 100 can include: a connecting module 110, an acquiring module 120, and a monitoring module 130.

The connecting module 110 is configured to establish remote connection with a hand-washing device.

The acquiring module 120 is configured to obtain usage information of the hand-washing device based on the remote connection.

The monitoring module 130 is configured to output hand-washing statistical data according to the acquired usage information.

In some embodiments, the usage information includes: the number of hand-washing acquired within a predetermined time length. The monitoring module 130 is further configured to: output whether the number of hand-washing within a predetermined time length reaches a predetermined number threshold.

In some embodiments, the usage information is acquired by responding to and recording hand-washing actions through infrared sensing by the hand-washing device.

In some embodiments, the usage information includes: information about that the hand-washing material is given off after responding to hand-washing actions through infrared sensing by the hand-washing device.

Figure 10:
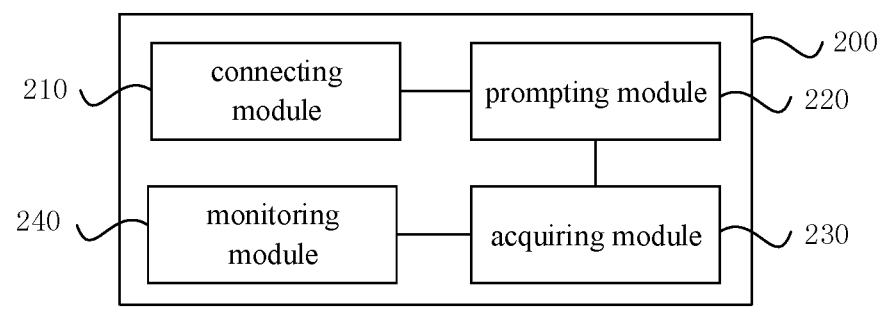
FIG. 10 is a block diagram of another hand-washing monitoring device shown according to an exemplary embodiment.

FIG. 10 is a block diagram of another hand-washing monitoring device 200 according to an exemplary embodiment. Referring to FIG. 10, the device can further include: a prompting module 220 configured to set in advance prompt information and send a prompt instruction used to prompt hand-washing based on the prompt information.

In some embodiments, the prompt information includes: time prompt information. The prompting module 220 is further configured to: send the prompt instruction to the hand-washing device according to the time prompt information set in advance.

In some embodiments, the hand-washing monitoring device further includes: an adjusting module configured to adjust the time prompt information according to the outputted hand-washing statistical data.

In some embodiments, the prompt information further includes: position prompt information. The prompting module 220 is further configured to: acquire current positioning information of the hand-washing device, and compare the positioning information with the position prompt information; and send, based on the comparison result, the prompt instruction when the positioning information is consistent with the position prompt information.

In some embodiments, the acquiring module 230 is further configured to: acquire the positioning information of the hand-washing device through a wearable device or the hand-washing device.

In some embodiments, the prompt information further includes: action information. The prompting module 220 sends a prompt instruction based on the prompt information in the following manners: acquiring heartbeat and/or body temperature of a user of the hand-washing device through a wearable device, and acquiring action information of the user of the hand-washing device based on the heartbeat and/or body temperature; and sending the prompt instruction when the action information of the user of the hand-washing device is consistent with the action information in the prompt information.

In some embodiments, sending a prompt instruction includes: sending a prompt instruction to the hand-washing device, or sending a prompt instruction to a bound wearable device.

In some embodiments, the prompt response includes one or more of a sound prompt, a vibration prompt, and a video prompt.

Figure 11:
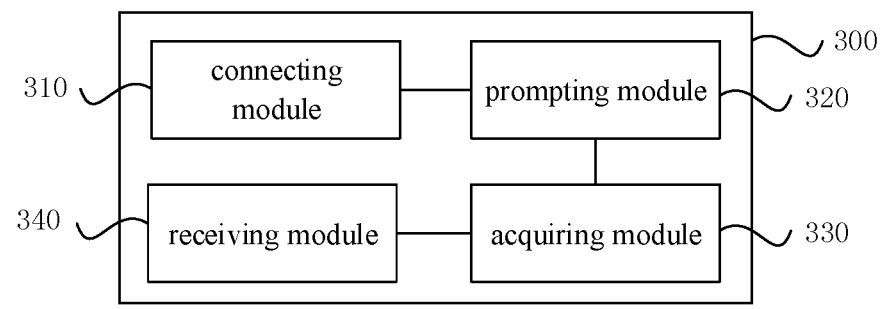
FIG. 11 is a block diagram of yet another hand-washing monitoring device shown according to an exemplary embodiment.

FIG. 11 is a block diagram showing another hand-washing monitoring device 300 according to an exemplary embodiment. Referring to FIG. 11, the device can further include:

a receiving module 340 configured to receive a change prompt for changing the hand-washing device or the hand-washing material.

With respect to the devices in the above embodiments, the specific manners for performing operations for individual modules therein have been described in detail in the embodiments regarding the hand-washing monitoring methods, which will not be elaborated herein.

Figure 12:
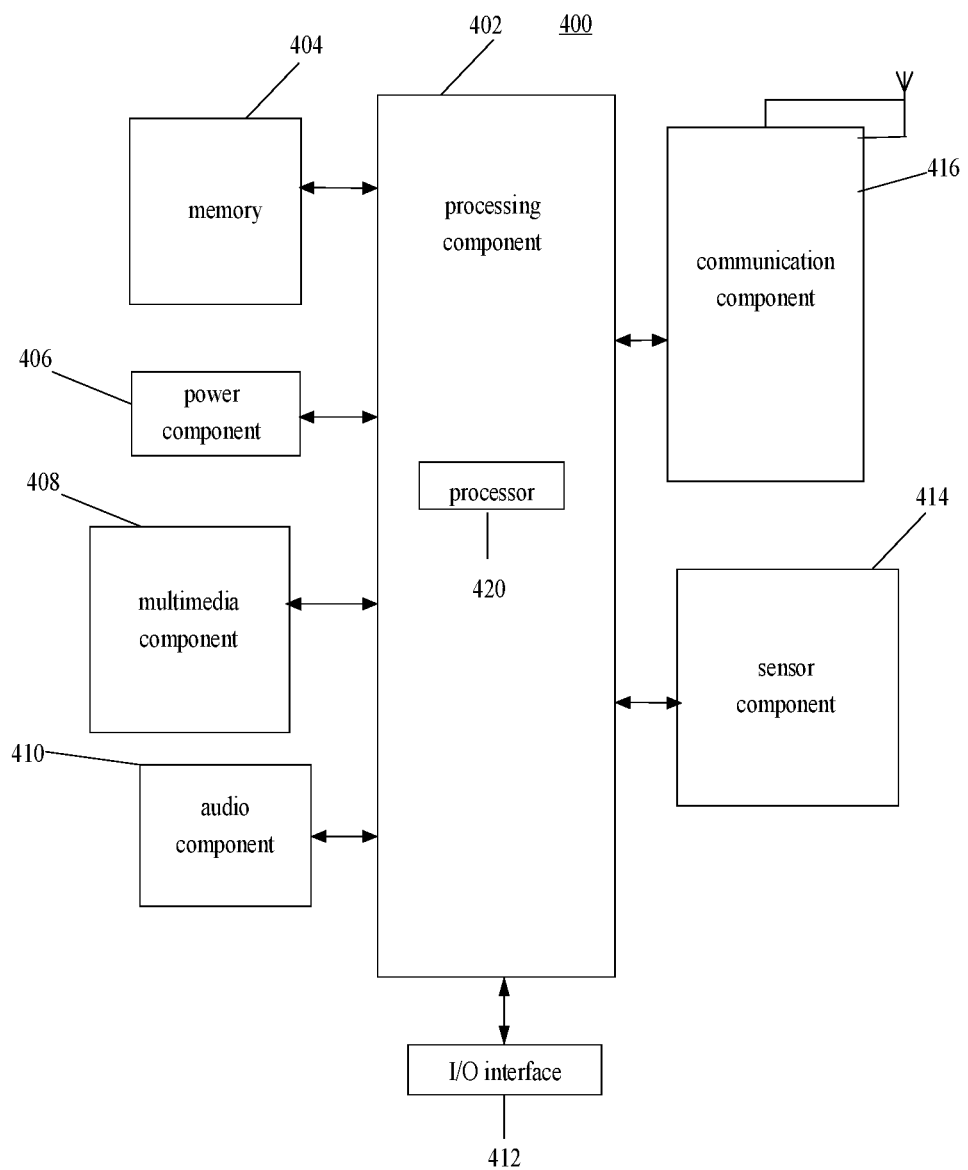
FIG. 12 is a block diagram of yet another hand-washing monitoring device shown according to an exemplary embodiment.

FIG. 12 is a block diagram of a hand-washing monitoring device 400 shown according to an exemplary embodiment. For example, the device 400 can be a mobile phone, a computer, a digital broadcast terminal, a messaging device, a gaming console, a tablet, a medical device, exercise equipment, a personal digital assistant, and the like.

Referring to FIG. 12, the device 400 can include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 can include one or more processors 420 to execute instructions to perform all or part of the steps in the above described methods. Moreover, the processing component 402 can include one or more modules which facilitate the interaction between the processing component 402 and other components. For instance, the processing component 402 can include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 can include a power management system, one or more power sources, and any other components associated with the generation, management, and distribution of power in the device 400.

The multimedia component 408 includes a screen providing an output interface between the device 400 and the user. In some embodiments, the screen can include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 408 includes a front camera and/or a rear camera. The front camera and the rear camera can receive an external multimedia datum while the device 400 is in an operation mode, such as a photographing mode or a video mode. Each of the front camera and the rear camera can be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal can be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons can include, but are not limited to, a home button, a volume button, a starting button, and a locking button.

The sensor component 414 includes one or more sensors to provide status assessments of various aspects of the device 400. For instance, the sensor component 414 can detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 can include a proximity sensor configured to detect the presence of nearby objects without any physical contact. The sensor component 414 can also include a light sensor, such as a CMOS or CCD image sensor, for use in imaging applications. In some embodiments, the sensor component 414 can also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as Wi-Fi, 2G, 3G, 4G, 5G, or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 400 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 404 including instructions, executable by the processor 420 in the device 400, for performing the above-described methods. For example, the non-transitory computer-readable storage medium can be a ROM, a RAM, a CD-ROM, a magnetic tape, a floppy disc, an optical data storage device, and the like.

A non-transitory computer-readable storage medium is provided, and when instructions in the storage medium are executed by a processor of a mobile terminal, the mobile terminal is enabled to execute one of the above methods.

Various embodiments of the present disclosure can have one or more of the following advantages.

A connection can be established between the terminal and the hand-washing device. The user of the terminal can remotely obtain usage situations of the hand-washing device through the connection, monitor hand-washing actions of the user of the hand-washing device in real time according to the usage situations of the hand-washing device, and supervise the hand-washing situations of the user of the hand-washing device.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A hand-washing monitoring method, comprising:
   establishing remote connection with a hand-washing device;
   acquiring usage information of the hand-washing device based on the remote connection;
   outputting hand-washing statistical data according to the acquired usage information, and
   setting in advance prompt information, and sending a prompt instruction based on the prompt information, the prompt instruction being configured to prompt hand-washing,
   wherein
   the prompt information comprises action information; and
   the sending a prompt instruction based on the prompt information comprises:
      acquiring at least one of heartbeat and body temperature of a user of the hand-washing device by a wearable device, and acquiring action information of the user of the hand-washing device based on at least one of the heartbeat and body temperature; and
      sending the prompt instruction when the action information of the user of the hand-washing device is consistent with the action information in the prompt information.

2. The hand-washing monitoring method according to claim 1, wherein
   the prompt information further comprises: time prompt information; and
   the sending a prompt instruction based on the prompt information comprises:
      sending the prompt instruction according to the time prompt information set in advance.

3. The hand-washing monitoring method according to claim 2, wherein the method further comprises:
   adjusting the time prompt information according to the outputted hand-washing statistical data.

4. The hand-washing monitoring method according to claim 1, wherein
   the prompt information further comprises: position prompt information; and
   the sending a prompt instruction based on the prompt information comprises:
      acquiring current positioning information of the hand-washing device, and comparing the positioning information with the position prompt information; and
      sending, based on the comparison result, the prompt instruction when the positioning information is consistent with the position prompt information.

5. The hand-washing monitoring method according to claim 4, wherein the acquiring current positioning information of the hand-washing device comprises:
   acquiring the positioning information of the hand-washing device by a wearable device or the hand-washing device.

6. The hand-washing monitoring method according to claim 1, wherein the sending a prompt instruction comprises one of sending a prompt instruction to the hand-washing device, and sending a prompt instruction to a bound wearable device.

7. The hand-washing monitoring method according to claim 1, wherein the prompt response comprises one or more of a sound prompt, a vibration prompt, and a video prompt.

8. The hand-washing monitoring method according to claim 1, wherein the usage information comprises: the number of hand-washing acquired within a predetermined time length;
   the outputting hand-washing statistical data according to the acquired usage information further comprises:
      outputting whether the number of hand-washing within a predetermined time length reaches a predetermined number threshold.

9. The hand-washing monitoring method according to claim 1, wherein the usage information is acquired by responding to and recording hand-washing actions through infrared sensing by the hand-washing device.

10. The hand-washing monitoring method according to claim 9, wherein the usage information comprises: information about that hand-washing material is given off after responding to hand-washing actions through infrared sensing by the hand-washing device.

11. The hand-washing monitoring method according to claim 9, wherein the hand-washing monitoring method further comprises:
    receiving a change prompt for changing one of the hand-washing device and the hand-washing material.

12. A hand-washing monitoring device, comprising:
    a memory device storing instructions; and
    a processor configured to invoke the instructions stored in the memory device to thereby:
    establish remote connection with a hand-washing device;
    acquire usage information of the hand-washing device based on the remote connection; and
    output hand-washing statistical data according to the acquired usage information, wherein the processor is further configured to:

set in advance prompt information and send a prompt instruction used to prompt hand-washing based on the prompt information;

the prompt information further comprises action information;

the processor is further configured to send a prompt instruction based on the prompt information by:

acquiring at least one of heartbeat and body temperature of a user of the hand-washing device by a wearable device, and acquiring action information of the user of the hand-washing device based on at least one of the heartbeat and body temperature; and sending the prompt instruction when the action information of the user of the hand-washing device is consistent with the action information in the prompt information.

13. The hand-washing monitoring device according to claim 12, wherein the prompt information comprises: time prompt information; and the processor is further configured to:

send the prompt instruction to the hand-washing device according to the time prompt information set in advance.

14. The hand-washing monitoring device according to claim 13, wherein the processor is further configured to:

adjust the time prompt information according to the outputted hand-washing statistical data.

15. The hand-washing monitoring device according to claim 12, wherein the prompt information further comprises: position prompt information and the processor is further configured to:

send a prompt instruction based on the prompt information in the following manners:

acquiring current positioning information of the hand-washing device, and comparing the positioning information with the position prompt information; and sending, based on the comparison result, the prompt instruction when the positioning information is consistent with the position prompt information.

16. A hand-washing monitoring system implementing a hand-washing monitoring method comprising:

establishing remote connection with a hand-washing device;

acquiring usage information of the hand-washing device based on the remote connection; and outputting hand-washing statistical data according to the acquired usage information, the hand-washing monitoring system comprising:

the hand-washing device, comprising:

a hand sanitizer bottle;

an infrared sensor;

a wireless controller;

a foaming component;

a foam outlet; and a battery;

a hand-washing monitoring device configured to:

establish the remote connection with the hand-washing device;

acquire the usage information of the hand-washing device based on the remote connection; and output the hand-washing statistical data according to the acquired usage information; and a wearable device configured to:

measure heartbeat and/or body temperature of a user of the hand-washing device;

obtain action information of the user based on the measured heartbeat and/or body temperature; and prompt the user to wash hands based on the action information and predetermined conditions.

17. A non-transitory computer-readable storage medium having stored therein instructions for execution by a processing circuit to implement operations of the hand-washing monitoring method according to claim 1.

* * * * *